United States Patent
Wright

(10) Patent No.: US 7,819,961 B2
(45) Date of Patent: Oct. 26, 2010

(54) MAGENTA DYES AND INKS FOR USE IN INK-JET PRINTING

(75) Inventor: Gavin Wright, Manchester (GB)

(73) Assignees: Fujifilm Imaging Colorants Limited, Manchester (GB); Fujifilm Corporation, Tokyo (JP)

( * ) Notice: Subject to any disclaimer, the term of this patent is extended or adjusted under 35 U.S.C. 154(b) by 0 days.

(21) Appl. No.: 12/600,866

(22) PCT Filed: May 12, 2008

(86) PCT No.: PCT/GB2008/001630

§ 371 (c)(1), (2), (4) Date: Nov. 19, 2009

(87) PCT Pub. No.: WO2008/142369

PCT Pub. Date: Nov. 27, 2008

(65) Prior Publication Data

US 2010/0183852 A1     Jul. 22, 2010

(30) Foreign Application Priority Data

May 22, 2007 (GB) ................ 0709773.6

(51) Int. Cl.
    C09D 11/02    (2006.01)
    C09B 29/045    (2006.01)

(52) U.S. Cl. .................... 106/31.48; 534/766

(58) Field of Classification Search ......... 106/31.48; 534/766; 347/100; 428/195.1
See application file for complete search history.

(56) References Cited

U.S. PATENT DOCUMENTS

| 7,249,834 B2 | 7/2007 | Ozawa ................. 347/100 |
| 7,273,519 B2 | 9/2007 | Taguchi et al. ......... 106/31.46 |
| 7,281,788 B2 | 10/2007 | Yabuki et al. .......... 347/100 |
| 7,287,848 B2 | 10/2007 | Taguchi et al. ......... 347/100 |
| 7,291,212 B2 | 11/2007 | Taguchi ............... 106/31.43 |
| 7,316,739 B2 | 1/2008 | Taguchi et al. ......... 106/31.49 |
| 2004/0122219 A1 | 6/2004 | Fujiwara et al. ........ 534/769 |
| 2005/0057629 A1 | 3/2005 | Taguchi et al. ......... 347/100 |
| 2006/0009357 A1* | 1/2006 | Fujiwara et al. ........ 503/227 |
| 2007/0117031 A1* | 5/2007 | Mizukawa et al. ....... 430/7 |
| 2007/0176991 A1 | 8/2007 | Arai .................. 347/100 |
| 2007/0176992 A1 | 8/2007 | Arai et al. ........... 347/100 |
| 2009/0142554 A1* | 6/2009 | Wright et al. .......... 106/31.48 |

FOREIGN PATENT DOCUMENTS

| EP | 1 508 597 A1 | 2/2005 |
| FR | 1.368.390 | 7/1964 |
| WO | WO 2007/083841 A1 | 7/2007 |

* cited by examiner

*Primary Examiner*—Helene Klemanski
(74) *Attorney, Agent, or Firm*—Morgan Lewis & Bockius LLP

(57) ABSTRACT

A compound of Formula (1) and salts thereof:

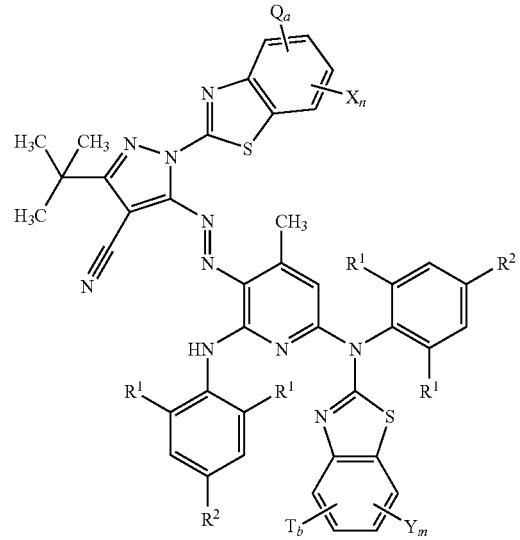

wherein:
$R^1$ and $R^2$ are independently H or optionally substituted alkyl;
X and Y are independently $CO_2H$ or COSH;
Q and T are independent substituents;
a+n is 0 to 4;
b+m is 0 to 4; and
n+m are at least 1;
also ink-jet compositions, processes and printed material.

14 Claims, No Drawings

MAGENTA DYES AND INKS FOR USE IN INK-JET PRINTING

This application is a 371 filing based on PCT/GB2008/001630 filed May 12, 2008 and claiming priority from United Kingdom Application No. 0709773.6, filed May 22, 2007.

This invention relates to dyes, to compositions and inks for ink-jet printers, to printing processes, to printed substrates and to ink-jet printer cartridges.

Ink-jet printing is a non-impact printing technique in which droplets of ink are ejected through a fine nozzle onto a substrate without bringing the nozzle into contact with the substrate. The inkset used in this technique typically comprise yellow, magenta, cyan and black inks.

With the advent of high-resolution digital cameras and ink-jet printers it is becoming increasingly common to print off photographs using an ink-jet printer.

While ink-jet printers have many advantages over other forms of printing and image development there are still technical challenges to be addressed. For example, there are the contradictory requirements of providing ink colorants that are soluble in the ink medium and yet display excellent wet-fastness (i.e. prints do not run or smudge when printed). The inks also need to dry quickly to avoid sheets sticking together after they have been printed, but they should not form a crust over the tiny nozzles in the printer head. When printed the colorants and inks should also be resistant to smear when a highlighter pen is run over a print. Storage stability is important to avoid particle formation that could block the tiny nozzles used in the printer especially since consumers can keep an ink-jet ink cartridge for several months. Furthermore, and especially important with photographic quality reproductions, the resultant images should not bronze or fade rapidly on exposure to light or common oxidising gases such as ozone. It is also important that the shade and chroma of the colorant are exactly right so that any image may be optimally reproduced.

Thus developing new colorants for ink-jet printing presents a unique challenge in balancing all these conflicting and demanding properties.

The present invention provides a compound of Formula (1) and salts thereof:

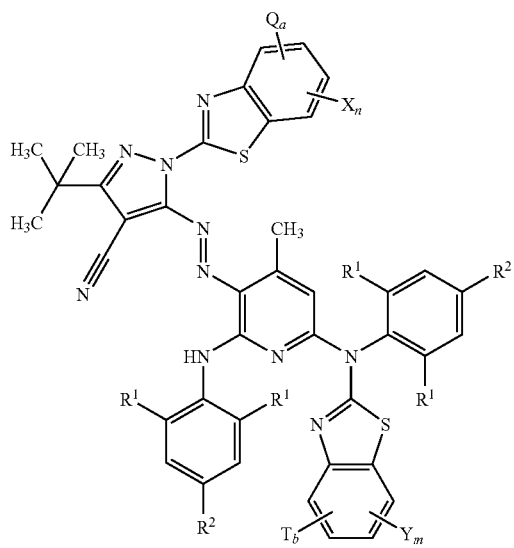

wherein:
$R^1$ and $R^2$ are independently H or optionally substituted alkyl;
X and Y are independently $CO_2H$ or COSH;
Q and T are independent substituents;
a+n is 0 to 4;
b+m is 0 to 4; and
n+m are at least 1.

$R^1$ and $R^2$ are preferably independently H or optionally substituted $C_{1-4}$-alkyl, more preferably H or unsubstituted $C_{1-4}$-alkyl and especially methyl or ethyl.

Optional substituents present on $R^1$ and $R^2$ are preferably independently selected from: optionally substituted alkoxy (preferably $C_{1-4}$-alkoxy), optionally substituted aryl (preferably phenyl), optionally substituted aryloxy (preferably phenoxy), optionally substituted heterocyclyl (including heteroaryl), polyalkylene oxide (preferably polyethylene oxide or polypropylene oxide), $CO_2H$, $SO_3H$, $PO_3H_2$, nitro, cyano, halo, ureido, —$SO_2F$, hydroxy, ester, sulphate, —$NR^aR^b$, —$COR^a$, —$CONR^aR^b$, —$NHCOR^a$, carboxyester, sulfone, and —$SO_2NR^aR^b$ wherein $R^a$ and $R^b$ are each independently H, optionally substituted alkyl (especially $C_{1-4}$-alkyl), —S—$R^c$, —O—$R^c$, —NH—$R^c$, wherein $R^c$ is optionally substituted alkyl (preferably $C_{1-4}$-alkyl), optionally substituted alkenyl (preferably $C_{1-4}$-alkenyl), optionally substituted alkynyl (preferably $C_{1-4}$-alkynyl), optionally substituted alkoxy (preferably $C_{1-4}$-alkoxy), optionally substituted aryl (preferably phenyl), optionally substituted aryloxy (preferably phenoxy), optionally substituted heterocyclyl, polyalkylene oxide (preferably polyethylene oxide or polypropylene oxide), optional substituents for any of the above substituents may be selected from the same list of substituents.

Preferably X and Y are $CO_2H$.

Q and T are preferably independently selected from: optionally substituted alkyl (preferably $C_{1-4}$-alkyl), optionally substituted alkenyl (preferably $C_{1-4}$-alkenyl), optionally substituted alkynyl (preferably $C_{1-4}$-alkynyl), optionally substituted alkoxy (preferably $C_{1-4}$-alkoxy), optionally substituted aryl (preferably phenyl), optionally substituted aryloxy (preferably phenoxy), optionally substituted heterocyclyl (including heteroaryl), polyalkylene oxide (preferably polyethylene oxide or polypropylene oxide), $SO_3H$, $PO_3H_2$, nitro, cyano, halo, ureido, —$SO_2F$, hydroxy, ester, sulphate, —$NR^aR^b$, —$COR^a$, —$CONR^aR^b$, —$NHCOR^a$, carboxyester, sulfone, and —$SO_2NR^aR^b$ wherein $R^a$ and $R^b$ are each independently H, optionally substituted alkyl (especially $C_{1-4}$-alkyl), —S—$R^c$, —O—$R^c$, —NH—$R^c$, wherein $R^c$ is optionally substituted alkyl (preferably $C_{1-4}$-alkyl), optionally substituted alkenyl (preferably $C_{1-4}$-alkenyl), optionally substituted alkynyl (preferably $C_{1-4}$-alkynyl), optionally substituted alkoxy (preferably $C_{1-4}$-alkoxy), optionally substituted aryl (preferably phenyl), optionally substituted aryloxy (preferably phenoxy), optionally substituted heterocyclyl, polyalkylene oxide (preferably polyethylene oxide or polypropylene oxide), optional substituents for any of the above substituents may be selected from the same list of substituents.

Preferably Q and T independently are —$SO_3H$, —$PO_3H_2$, halo, nitro, cyano, —$COR^d$ or —$CONR^dR^e$ where $R^d$ and $R^e$ are each independently H, optionally substituted alkyl (especially optionally substituted $C_{1-4}$-alkyl) or optionally substituted aryl (especially optionally substituted phenyl).

More preferably Q and T are the same.

Preferably when a and b are greater than 0 they are the same.

Preferably a is 0.
Preferably b is 0.
Preferably n is 1.
Preferably m is 1.
More preferably both n and m are 1.

The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with theom/no groups present in natural fibres to form a covalent linkage between the fibre and the dye. As examples of fibre reactive groups excluded from the compounds of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endomethylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid and basic groups on the compounds of Formula (1), particularly acid groups, are preferably in the form of a salt. Thus, the Formulae shown herein include the compounds in free acid and in salt form.

Preferred salts are alkali metal salts, especially lithium, sodium and potassium, ammonium and substituted ammonium salts (including quaternary amines such as ($(CH_3)_4N^+$) and mixtures thereof. Especially preferred are salts with sodium, lithium, ammonia and volatile amines, more especially sodium salts. The compounds of Formula (1) may be converted into a salt using known techniques.

The compounds of Formula (1) may exist in tautomeric forms other than those shown in this specification. These tautomers are included within the scope of the present invention.

The compounds of Formula (1) may be prepared using known processes, such as those described in WO2002083662 and US 2006/0009357 which are incorporated herein by reference.

The compounds of Formula (1) have attractive, strong red, violet and magenta shades (especially magenta) and are valuable colorants for use in the preparation of ink-jet printing inks. They benefit from a good balance of solubility, storage stability and fastness to water, ozone and light. In particular they display excellent wet fastness and ozone fastness.

According to a second aspect of the present invention there is provided a composition comprising a compound of Formula (1) and/or a salt thereof, as described in the first aspect of the invention, and a liquid medium.

Preferred compositions according to the second aspect of the invention comprise:

(a) from 0.01 to 30 parts of a compound of Formula (1) and salts thereof according to the first aspect of the invention; and
(b) from 70 to 99.99 parts of a liquid medium;

wherein all parts are by weight.

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5 and especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration magenta ink, a low concentration magenta ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones, preferably sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. Nos. 4,963,189, 4,703,113, 4,626,284 and EP-A-425,150.

When the liquid medium comprises organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dyes in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; and C.I. Acid Yellow 23.

It is preferred that the composition according to the invention is ink suitable for use in an ink-jet printer. Ink suitable for use in an ink-jet printer is ink which is able to repeatedly fire through an ink-jet printing head without causing blockage of the fine nozzles. To do this the ink must be particle free, stable (i.e. not precipitate on storage), free from corrosive elements (e.g. chloride) and have a viscosity which allows for good droplet formation at the print head.

Ink suitable for use in an ink-jet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colourant or additive incorporated in the ink).

Preferably ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

A third aspect of the invention provides a process for forming an image on a substrate comprising applying a composition, preferably ink suitable for use in an ink-jet printer, according to the second aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. Photographic quality papers are especially preferred. Photographic quality paper are high-gloss papers which give a similar finish to that typically seen with silver halide photo printing.

A fourth aspect of the present invention provides a material preferably paper, plastic, a textile, metal or glass, more preferably paper, an overhead projector slide or a textile material, especially paper more especially plain, coated or treated papers printed with a compound as described in the first aspect of the invention, a composition according to the second aspect of the invention or by means of a process according to the third aspect of the invention.

It is especially preferred that the printed material of the fourth aspect of the invention is a print on a photographic quality paper printed using a process according to the third aspect of the invention.

A fifth aspect of the present invention provides an ink-jet printer cartridge comprising a chamber and a composition, preferably ink suitable for use in an ink-jet printer, wherein the composition is in the chamber and the composition is as defined and preferred in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

EXAMPLE 1

Preparation of:

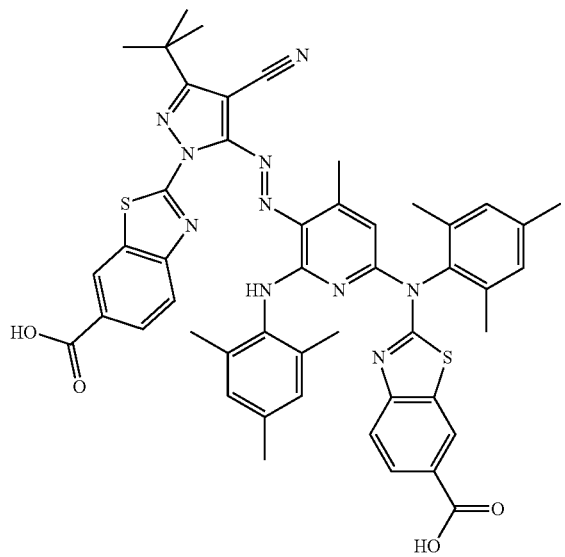

Stage 1(a)

Preparation of Intermediate (1a):

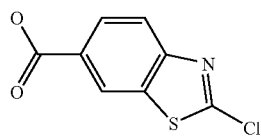

Intermediate (1a)

A mixture of 4-aminobenzoic acid (68.5 g, 0.50 mol), potassium thiocyanate (146 g, 1.50 mol) and acetic acid (800 ml) was stirred at 25° C. for 2 hours. A solution of bromine (30 ml, 0.58 mol) in acetic acid (250 ml) was then added drop-wise at 15 to 20° C. The resultant mixture was stirred for 1 hour at 25° C. and the precipitate which formed was collected by filtration, washed with water (4000 ml) and dried. The precipitate was then suspended in a mixture of concentrated hydrochloric acid (100 ml) and water (2000 ml) and stirred at 95 to 100° C. for 1 hour. This mixture was allowed to cool and the pH was adjusted to 4 with sodium acetate. The solid which precipitated was collected by filtration, washed with water and dried in an oven at 50° C. The solid (19.4 g) and copper (I) chloride (2.2 g) were suspended in a mixture of concentrated hydrochloric acid (280 ml) and water (280 ml) at 20° C. and a solution of sodium nitrite (70 g, 1.0 mol) in water (200 ml) was added drop-wise. The reaction mixture was stirred at 20° C. for 16 hours and the resultant precipitate was collected by filtration and washed with water (10 L). The solid was then dried in an oven at 50° C. to give 13.8 g of product as a yellow solid.

Stage 1(b)

Preparation of Intermediate (1b):

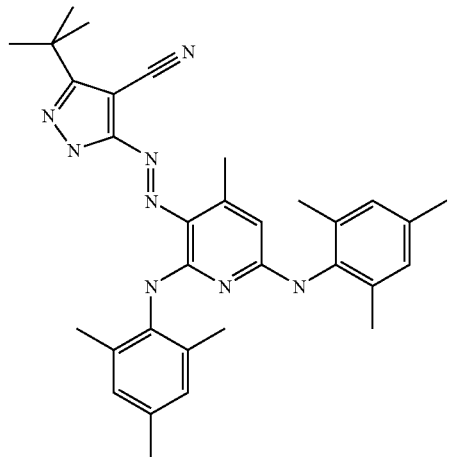

Intermediate (1b)

Intermediate (1b) was prepared according to the method described in WO 2002083795

Stage 1(c)

Preparation of the Title Compound:

A mixture of intermediate (1a) (10.7 g, 0.05 mol), intermediate (1b) (11.5 g, 0.02 mol), tetrabutylammonium bromide (0.65 g, 0.002 mol), potassium carbonate (6.9 g) and dimethylsulfoxide (50 ml) was stirred in an atmosphere of nitrogen at 110° C. for 10 hours. The reaction mixture was cooled to 20° C., added to acetone (500 ml) and the resultant precipitate collected by filtration. The crude product was purified by column chromatography on silica gel, eluting with a mixture of methanol (70%) and ethyl acetate (30%) to give the title product as a red solid.

Comparative Dye

The comparative dye was Example 6-4 from International Patent Application WO 02/083662.

Preparation of Inks

Inks was prepared by dissolving 3.5 g of the dye of Example 1 and the Comparative Dye in 96.5 g of a liquid medium comprising:

| | |
|---|---|
| Diethylene glycol | 7% |
| Ethylene glycol | 7% |
| 2-Pyrollidone | 7% |
| Surfynol ™ 465 | 1% |
| Tris buffer | 0.2% |
| Water | 77.8% (all % by weight) | and adjusting the pH of the ink to 8-8.5 using sodium hydroxide. Surfynol® 465 is a surfactant from Air Products.

Ink-jet Printing

The Example Ink and Comparative Ink, prepared as described above, were filtered through a 0.45 micron nylon filter and then incorporated into empty print cartridges using a syringe.

This ink was printed as a series of 4 parallel bars at 100% depth, using an ink-jet printer, on to the following ink-jet media.

HP Advanced Plain Paper (HPA)
HP Printing Paper (HPP)
Xerox® 4024 Premium Multipurpose White Paper (4024).

The average reflected optical density and CIE colour co-ordinates L, a, b of the printed bars were then measured using a Gretag® spectrolino spectrophotometer.

Wet Fastness

The prints obtained above were allowed to dry for 24 hours and evaluated for their wet fastness as follows.

Each print was placed on an A frame at a 45° angle such that the parallel bars were in a horizontal direction. Using an Eppendorf Research Pro electronic pipette 0.1 ml of deionised water was allowed to run down the print. To apply the water to the print the pipette aspirate and dispense function was set to 10 and the pipette was held above the print at an angle of 90° to the lab bench and 5 mm above the top bar of the print. The water was then dispensed down the print and this process was repeated 5 times for each print. The prints were then allowed to air dry for 24 hours. When dry the average reflected optical density and CIE colour co-ordinates L, a, b of printed bar 1 was measured using a Gretag® spectrolino spectrophotometer.

The change in shade of printed bar 1 on exposure to water is expressed as ΔE where a lower figure indicates higher wet fastness.

ΔE is defined as the overall change in the CIE colour co-ordinates L, a, b of printed bar 1 of the print and is expressed by the equation $$\Delta E = (\Delta L^2 + \Delta a^2 + \Delta b^2)^{0.5}.$$

where ΔL, Δa and Δb represent the change in the CIE colour co-ordinates after exposure to water.

The Gretag® spectrolino spectrophotometer was set to the following parameters:

| Measuring Geometry: | 0°/45° |
| Spectral Range: | 380-730 nm |
| Spectral Interval: | 10 nm |
| Illuminant: | D50 |
| Observer: | 2° (CIE 1931) |
| Density: | Ansi A |
| External Filler: | None |

The results of the wet fastness tests are shown in the Table below.

|  | ΔE HPA | ΔE HPP | ΔE 4024 |
| --- | --- | --- | --- |
| Example ink | 3.52 | 2.73 | 2.77 |
| Comparative Ink | 4.06 | 14.59 | 8.09 |

Clearly prints formed using the compounds and inks of the present invention display an enhanced wet-fastness.

Further Inks

The inks described in Tables A and B may be prepared using the compound of Example 1. Numbers quoted in the second column onwards refer to the number of parts of the relevant ingredient and all parts are by weight. The inks may be applied to a substrate by ink-jet printing.

The following abbreviations are used in Tables A and B:
PG=propylene glycol
DEG=diethylene glycol
NMP=N-methyl pyrrolidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Dye Content | Water | PG | DEG | NMP | DMK | NaOH | Na Stearate | IPA | MEOH | 2P | MIBK |
| --- | --- | --- | --- | --- | --- | --- | --- | --- | --- | --- | --- |
| 2.0 | 80 | 5 |  | 6 | 4 |  |  |  |  | 5 |  |
| 3.0 | 90 |  | 5 | 5 |  | 0.2 |  |  |  |  |  |
| 10.0 | 85 | 3 |  | 3 | 3 |  |  |  | 5 | 1 |  |
| 2.1 | 91 |  | 8 |  |  |  |  |  |  |  | 1 |
| 3.1 | 86 | 5 |  |  |  |  | 0.2 | 4 |  |  | 5 |
| 1.1 | 81 |  |  | 9 |  | 0.5 | 0.5 |  |  | 9 |  |
| 2.5 | 60 | 4 | 15 | 3 | 3 |  |  | 6 | 10 | 5 | 4 |
| 5 | 65 |  | 20 |  |  |  |  | 10 |  |  |  |
| 2.4 | 75 | 5 | 4 |  | 5 |  |  |  | 6 |  | 5 |
| 4.1 | 80 | 3 | 5 | 2 | 10 |  | 0.3 |  |  |  |  |
| 3.2 | 65 |  | 5 | 4 | 6 |  |  | 5 | 4 | 6 | 5 |
| 5.1 | 96 |  |  |  |  |  |  |  | 4 |  |  |
| 10.8 | 90 | 5 |  |  |  |  |  | 5 |  |  |  |
| 10.0 | 80 | 2 | 6 | 2 | 5 |  |  | 1 |  | 4 |  |
| 1.8 | 80 |  | 5 |  |  |  |  |  |  | 15 |  |
| 2.6 | 84 |  |  | 11 |  |  |  |  |  | 5 |  |
| 3.3 | 80 | 2 |  |  | 10 |  |  |  | 2 |  | 6 |
| 12.0 | 90 |  |  |  | 7 | 0.3 | 3 |  |  |  |  |
| 5.4 | 69 | 2 | 20 | 2 | 1 |  |  |  |  | 3 | 3 |
| 6.0 | 91 |  |  | 4 |  |  |  |  |  | 5 |  |

TABLE B

| Dye Content | Water | PG | DEG | NMP | CET | TBT | TDG | BDL | PHO | 2P | PI2 |
|---|---|---|---|---|---|---|---|---|---|---|---|
| 3.0 | 80 | 15 | | | 0.2 | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | 5 | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 10.0 | 91 | | | 6 | | | | | | 3 | |
| 9.0 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | 10 | | | | | | | | |
| 2 | 88 | | | | | | 10 | | | | |
| 5 | 78 | | | 5 | | | 12 | | | 5 | |
| 8 | 70 | 2 | | 8 | | | 15 | | | 5 | |
| 10 | 80 | | | | | | 8 | | | 12 | |
| 10 | 80 | | 10 | | | | | | | | |

The invention claimed is:

1. A compound of Formula (1) and salts thereof:

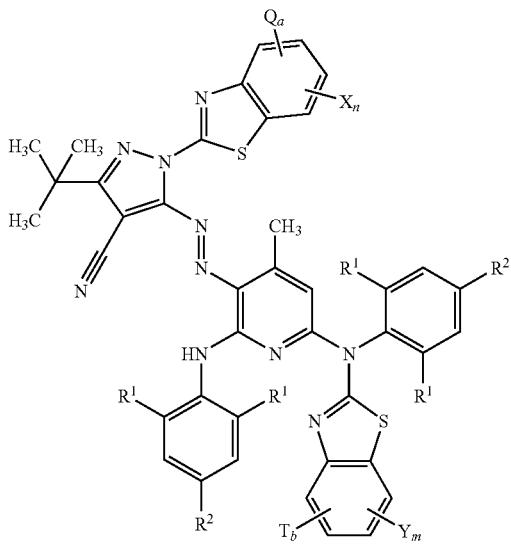

wherein:
$R^1$ and $R^2$ are independently H or optionally substituted alkyl;
X and Y are independently $CO_2H$ or COSH;
Q and T are independent substituents;
a+n is 0 to 4;
b+m is 0 to 4; and
n+m are at least 1.

2. A compound of Formula (1) and salts thereof as claimed in claim 1 wherein $R^1$ and $R^2$ are independently H or optionally substituted $C_{1-4}$-alkyl.

3. A compound of Formula (1) and salts thereof as claimed in claim 1 wherein $R^1$ and $R^2$ are independently methyl or ethyl.

4. A compound of Formula (1) and salts thereof as claimed in claim 1 wherein X and Y are $CO_2H$.

5. A compound of Formula (1) and salts thereof as claimed in claim 1 wherein Q and T are the same.

6. A compound of Formula (1) and salts thereof as claimed in claim 1 wherein both m and n are 1.

7. A composition comprising a compound of Formula (1) and/or a salt thereof, as described in claim 1, and a liquid medium.

8. A composition as claimed in claim 7 which comprises
  (a) from 0.01 to 30 parts of a compound of Formula (1) and salts thereof; and
  (b) from 70 to 99.99 parts of a liquid medium;
wherein all parts are by weight.

9. A composition as claimed in claim 7 wherein the liquid medium comprises a mixture of water and organic solvent or organic solvent free from water.

10. A composition as claimed in claim 7 which is ink suitable for use in an ink-jet printer.

11. A process for forming an image on a substrate comprising applying ink suitable for use in an ink-jet printer, according to claim 10, thereto by means of an ink-jet printer.

12. A material printed with a compound as described in claim 1.

13. A material as claimed in claim 12 which is a print on a photographic quality paper.

14. An ink-jet printer cartridge comprising a chamber and ink suitable for use in an ink-jet printer, according to claim 10, wherein the ink is in the chamber.

* * * * *